R. N. DYER.
AUTOMATIC AIR TRAP.
APPLICATION FILED FEB. 27, 1907.
942,368.
Patented Dec. 7, 1909.
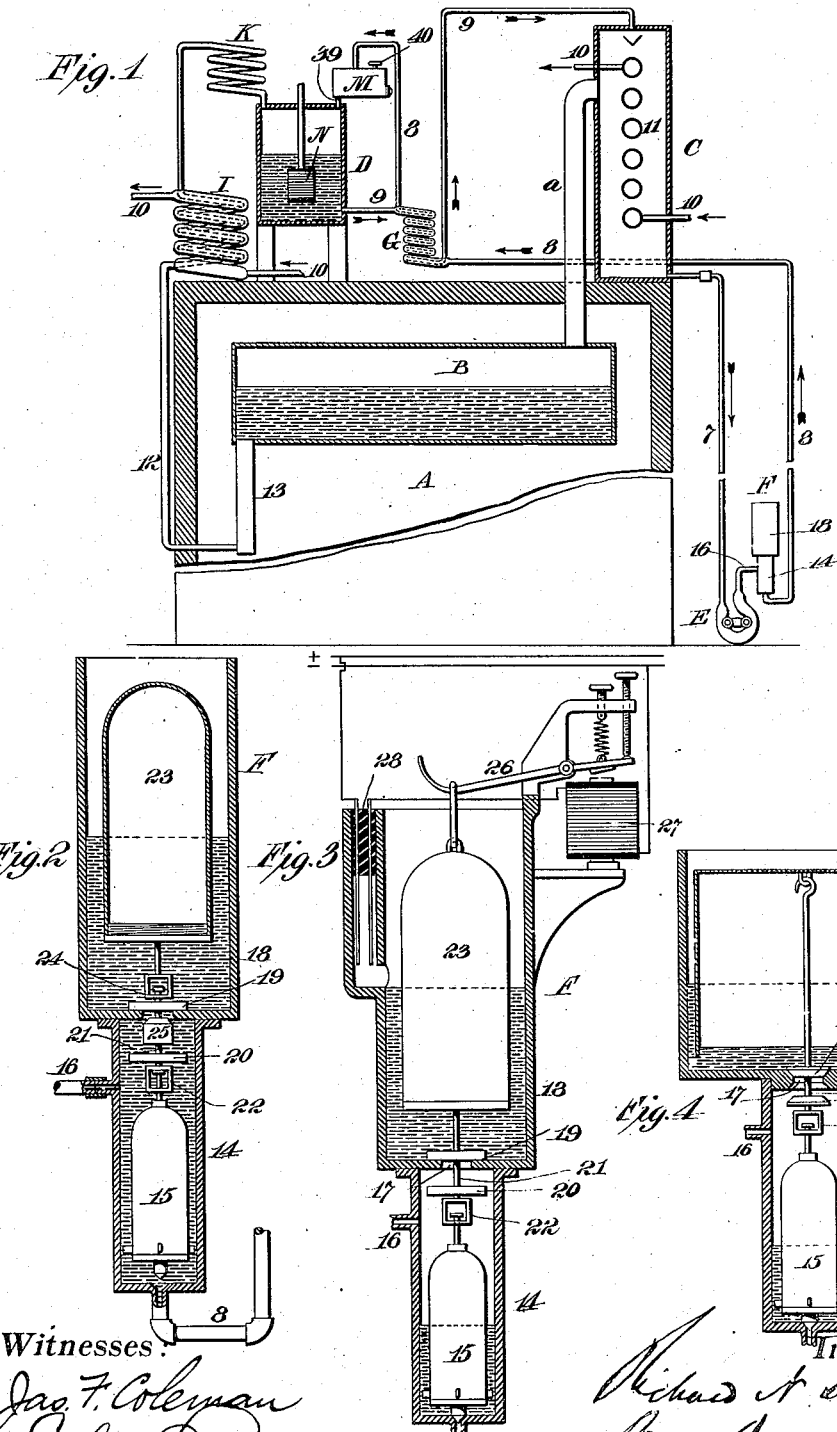

UNITED STATES PATENT OFFICE.

RICHARD N. DYER, OF EAST ORANGE, NEW JERSEY.

AUTOMATIC AIR-TRAP.

942,368. Specification of Letters Patent. Patented Dec. 7, 1909.

Application filed February 27, 1907. Serial No. 359,640.

*To all whom it may concern:*

Be it known that I, RICHARD N. DYER, a citizen of the United States, residing at East Orange, county of Essex, State of New Jersey, have invented a certain new and useful Improvement in Automatic Air-Traps, of which the following is a specification.

In the drawing, Figure 1 is a vertical section and partial elevation showing the general structural elements of a refrigerating machine to which the automatic air trap is applied; and Figs. 2, 3 and 4 are sectional views on a larger scale showing different forms of the improved automatic air trap.

Referring particularly to Fig. 1, A is the refrigerating chamber, B the brine reservoir, C the absorber, and D the still as usual in machines of this class. E is the pump for withdrawing the potash solution and entrapped air bubbles from the absorber through the drop tube 7. F is the air-trap at which the air is separated from the potash solution and discharged from the apparatus. The potash solution is returned to the still through the pipe 8, forming the outer pipe of a double-pipe heat-exchanger G. The concentrated potash solution flows from the still through the pipe 9, forming the inner pipe of the exchanger G and rising to the top of the absorber into which the solution is discharged, the difference in level maintaining the difference in pressure between the still and absorber. I is the condenser whose inner pipe is connected through the rectifying coil K with the still and receives the water vapor therefrom. The outer pipe of the condenser is connected with the water circulating pipe 10, as are also the cooling pipes 11 in the absorber. For simplicity of illustration, the connections of the water circulation with the absorber pipes 11 and the condenser I are not carried out in the drawing. The direction of the water circulation is shown by arrows with barbs only, while the circulation of the absorbent solution is shown by arrows with barbs and feathers. The water vapor from the still passing through the rectifying coil K enters the inner pipe of the condenser I, from which the water of condensation is carried by the pipe 12 to the pipe 13 depending from the brine reservoir so as to form a hydrostatic column maintaining by means of the entrapped air in the pipe 12 the difference in pressure between the brine reservoir on the one hand and the still and condenser on the other hand. The water vapor from the brine in the reservoir B passes into the absorber C through the large pipe *a* where it is absorbed by the potash solution flowing down over the cooling pipes 11 which carry off the heat. The potash solution is drawn off with entrapped air bubbles from the absorber C by the drop tube 7 and pump E and the potash solution freed of air is returned to the still by pipe 8, where it is concentrated by heat, the concentrated solution returning to the absorber through the pipe 9. The water vapor distilled from the potash solution in the still D is condensed in the condenser I and returned to the brine through the pipes 12, 13.

The present invention relates to the automatic air-trap, shown by Figs. 2, 3 and 4. The purpose of the automatic air-trap is to separate the air from the absorbent solution withdrawn with entrapped air bubbles from the absorber by the pump, and to discharge the air from the circulating system at intervals, so that the pump will not be required to work against atmospheric pressure for any considerable portion of the time, and the amount of absorbent solution which can be circulated by a pump of given power will be greatly increased.

The improved automatic air-trap involves the employment of a float valve contained in a closed chamber, into which the solution and air are discharged by the pump, and from which the solution, freed of air, passes into the pipe leading to the still. When the liquid level in this chamber is lowered sufficiently by the accumulation of air therein to seat the float valve, the flow of the liquid to the still is cut off and the further operation of the pump, forcing liquid into the chamber, expels the accumulated air through a controlled opening in the top of the chamber. When the air is entirely expelled and the chamber filled with the liquid, devices are brought into action which lift the float valve from its seat, reopening the passage to the still, so that the flow of the solution into the still is reëstablished. The float valve, once unseated, remains floating above its seat until the liquid level is again lowered by the accumulation of air.

The device for lifting the float valve from its seat may be varied in character, three forms being illustrated by the drawing. The float-valve chamber 14 has connected with its bottom, the pipe 8 through which the solution is discharged into the still, the continuation of this pipe into the chamber forming a valve seat for the float valve 15. This float valve is a light, hollow body, weighted so as to float upright and carrying on its lower end a valve which closes the opening in the bottom of the chamber 14. The liquid and entrapped air bubbles are discharged into the chamber 14 by the pipe 16, leading from the pump and which may be connected to the chamber 14 at any suitable point.

In the top of the chamber 14 is an opening 17, connected with an upper chamber 18, and this opening is controlled by two valves, 19, 20 carried by a stem 21. The float 15 is connected to the stem 21 by means, such as a yoke 22, permitting the float 15 to float above its seat when the valve stem 21 is in its lowermost position, as illustrated in Fig. 2.

Referring particularly to Fig. 2, the chamber 18 has a float 23 which is connected with the valve stem 21 by means of a yoke 24, permitting independent upward movement of the valve stem. The valve stem 21 carries below the opening 17 a piston 25, fitting accurately the opening 17. When the liquid level is lowered by the accumulation of air in the chamber 14, so that the float valve 15 will seat and cut off the flow into the pipe 8, the continued pumping of liquid and air into the chamber 14 will produce a pressure which will force the air out through the opening 17, under the valve 19, until the chamber 14 is again entirely filled with liquid. During this time the float valve 15 remains seated due to the fact that the liquid in the chamber 14 is under a pressure greater than that which exists in the pipe 8. When the chamber 14 becomes entirely filled with liquid and the liquid begins to flow through the opening 17 into the chamber 18, the float 23 rises drawing the piston 25 into the opening 17 with the result that the further effort of the pump is exerted upon the piston 25, forcing the same upwardly into the opening 17 and pulling the float valve 15 from its seat. This upward motion of the piston 25 under the impulse of the pump is permitted to take place without further lifting the float 23, on account of the lost motion at the yoke 24. As soon as the float valve 15 is withdrawn from its seat, it floats upwardly and the liquid beginning to flow out of the chamber 14 into the pipe 8, the liquid level in the chamber 18 lowers until the valve 19 is seated. At this time the chamber 14 is entirely filled with liquid and the float valve 15 is held above its seat by its buoyancy as shown in Fig. 2. As the liquid and air are forced into the chamber 14 through the pipe 16, the air accumulates in the top of the chamber 14 until the liquid level is lowered sufficiently to again seat the float valve 15 when the operation of expelling the air is repeated. The purpose of the lower valve 20 is to prevent the overflow of the chamber 18, should any accident occur to the apparatus, such as the losing of the vacuum, which would cause the accumulation of liquid in the chambers 14 and 18, resulting in the closing of the opening 17 by the valve 20 before the chamber 18 overflows.

Another means for unseating the float valve 15 is illustrated in Fig. 3, in which the energy for doing this work is provided by the electric current. The valve stem 21 is not provided with the piston 25, but is connected with the armature lever 26 of an electromagnet 27. In the side of the chamber 18 near its top is located a contact plug 28, carrying contacts at which the circuit of the magnet 27 is broken. The plug 28 is adjustable by sliding it up and down in the tube in which it is located. When the liquid level rises in the chamber 18 sufficiently to cover the ends of the contacts, the circuit of the magnet 27 will be closed and this magnet moving its armature lever will give an upward pull upon the float valve 15 of sufficient length to unseat it. The unseating of the float valve will cause the liquid level to lower in the chamber 18, breaking the circuit to the magnet 27, with the result of allowing the valve stem 21 to drop down and the valve 19 to seat itself over the opening 17. The float 23 which is shown arranged intermediate between the valve stem 21 and the armature lever 26 is not essential to the unseating device in this form. It serves the purpose however of drawing the valve 20 to its seat, closing the opening 17 from its under side and preventing the overflow of the chamber 18, should the machine lose its vacuum and the electromagnet be inoperative. In Fig. 3, the level of the solution in the chamber 14 is shown when enough air has accumulated to seat the float valve 15.

In Fig. 4 is shown another modification of the means for unseating the float valve 15. Here this operation is performed directly by a large float 29 having sufficient buoyancy to overcome the force tending to hold the float-valve 15 to its seat. The air will first be expelled from the chamber 14 under the valve 19 until the chamber 14 is entirely filled with liquid when the liquid level in the chamber 18 will begin to rise causing the float 29 to lift the float valve 15 from its seat and permitting the float valve 15 to rise by its own buoyancy into the position shown in Fig. 2.

I have described my improved automatic air trap in connection with a certain type of refrigerating machine, since it has been found useful in that machine and its mode of operation can be better understood when explained in connection therewith; but it is evident that the automatic air trap can be applied to any situation where a pump is used which receives liquid and air or other gas on its inlet side and delivers the liquid against a pressure less than that of the atmosphere and where it is desired to separate the air or gas from the liquid and discharge it from the pipe system without requiring the pump to work constantly against atmospheric pressure.

The invention involved in the combination of the automatic air trap with the elements of a refrigerating machine is not specifically claimed herein, but is reserved for another application for patent (Serial No. 348051, filed December 15, 1906).

What I claim is:

1. The combination with a pump receiving air and liquid and a receptacle to which the liquid freed of air is delivered against a pressure less than that of the atmosphere, of an automatic air trap located between the pump and such receptacle intermittently discharging the air and closed against atmospheric pressure between the intervals of discharging air, whereby the pump will not work against atmospheric pressure in delivering liquid to such receptacle.

2. The combination with a pump receiving air and liquid, of an automatic intermittently acting air trap connected with the discharge of the pump including a chamber in which the air accumulates while the liquid freed of air is forced from said chamber against a pressure less than that of the atmosphere, and automatic means for automatically closing the liquid outlet from said chamber and for causing the effort of the pump to expel the air therefrom against atmospheric pressure, whereby between intervals of air expulsion the pump will not work against atmospheric pressure.

3. The combination with a pump receiving air and liquid, and a receptacle to which the liquid freed of air is delivered against a pressure less than that of the atmosphere, of a closed chamber intermediate between the pump and said receptacle for separating the air from the liquid, and automatic means controlled by the level of the liquid in said chamber closing the liquid outlet from said chamber and permitting the pump to displace the air therefrom.

4. The combination with a pump receiving air and liquid, and a receptacle to which the liquid freed of air is delivered against a pressure less than that of the atmosphere, of a closed chamber intermediate between the pump and said receptacle for separating the air from the liquid, automatic means controlled by the lowering of the liquid level in said chamber closing the liquid outlet from said chamber and permitting the pump to displace the air from said chamber, and automatic means controlled by the rise in the liquid level for opening said outlet.

5. The automatic air-trap having in combination, a closed chamber having a liquid outlet and a float valve closing the liquid outlet from such chamber when the accumulation of air in the chamber lowers the liquid level, a controlled opening in such chamber through which the accumulated air is expelled from the chamber and means for unseating the float valve after the air is expelled, substantially as set forth.

6. The automatic air-trap having in combination, connected superimposed chambers, the upper chamber being open to the air, a valve in the upper chamber controlling the opening into the lower chamber, an inlet through which air and liquid are delivered to the lower chamber, a liquid outlet from the lower chamber, a float valve in the lower chamber closing the liquid outlet therefrom when the liquid level therein is lowered by the accumulation of air, and means for unseating the float valve after the air is expelled from the lower chamber, substantially as set forth.

7. The automatic air-trap having in combination, connected superimposed chambers, the upper chamber being open to the air, a valve in the upper chamber controlling the opening into the lower chamber, an inlet through which air and liquid are delivered to the lower chamber, a liquid outlet from the lower chamber, a flat valve in the lower chamber closing the liquid outlet therefrom when the liquid level therein is lowered by the accumulation of air, a piston fitting the opening between the two chambers and a float in the upper chamber for drawing the piston into said opening by the rise of the liquid in the upper chamber, substantially as set forth.

This specification signed and witnessed this 26th day of February, 1907.

RICHARD N. DYER.

Witnesses:
 JOHN S. LOTSCH,
 LEONARD H. DYER.